(12) United States Patent
Pariyani et al.

(10) Patent No.: US 10,268,962 B2
(45) Date of Patent: Apr. 23, 2019

(54) DYNAMIC PREDICTION OF RISK LEVELS FOR MANUFACTURING OPERATIONS THROUGH LEADING RISK INDICATORS: DYNAMIC RISK ANALYZER ENGINE

(71) Applicant: Near-Miss Management LLC, Philadelphia, PA (US)

(72) Inventors: Ankur Pariyani, Philadelphia, PA (US); Dmitriy Bespalov, Philadelphia, PA (US); Ulku G. Oktem, Philadelphia, PA (US); Luis Cielak, Philadelphia, PA (US)

(73) Assignee: Near-Miss Management LLC, Philadelphia, PA (US)

( * ) Notice: Subject to any disclaimer, the term of this patent is extended or adjusted under 35 U.S.C. 154(b) by 506 days.

(21) Appl. No.: 15/012,109

(22) Filed: Feb. 1, 2016

(65) Prior Publication Data

US 2016/0148107 A1     May 26, 2016

Related U.S. Application Data

(63) Continuation-in-part of application No. 14/511,729, filed on Oct. 10, 2014, now Pat. No. 9,495,863.
(Continued)

(51) Int. Cl.
| | |
|---|---|
| *G08B 23/00* | (2006.01) |
| *G06N 5/04* | (2006.01) |
| *G05B 23/02* | (2006.01) |

(52) U.S. Cl.
CPC ............ *G06N 5/04* (2013.01); *G05B 23/024* (2013.01); *G05B 23/0278* (2013.01)

(58) Field of Classification Search
CPC .... G06N 5/04; G05B 23/0278; G05B 23/024; G05B 19/41875; G05B 23/0283;
(Continued)

(56) References Cited

U.S. PATENT DOCUMENTS

| | | |
|---|---|---|
| 4,869,528 A | 9/1989 | Buma |
| 5,355,395 A | 10/1994 | Kenneth |

(Continued)

OTHER PUBLICATIONS

Oktem, U.S. Appl. No. 61/545,671.
(Continued)

*Primary Examiner* — Anh V La
(74) *Attorney, Agent, or Firm* — Stradley Ronon Stevens & Young, LLP

(57) ABSTRACT

The dynamic risk analyzer (DRA) provided by the present invention periodically assesses real-time or historic process data, or both, associated with an operations site, such as a manufacturing, production, or processing facility, including a plant's operations, and identifies hidden near-misses of such operation, when in real time the process data appears otherwise normal. DRA assesses the process data in a manner that enables operating personnel including management at a facility to have a comprehensive understanding of the risk status and changes in both alarm and non-alarm based process variables. The hidden process near-miss data may be analyzed alone or in combination with other process data and/or data resulting from prior near-miss situations to permit strategic action to be taken to reduce or avert the occurrence of adverse incidents or catastrophic failure of a facility operation.

6 Claims, 4 Drawing Sheets

Related U.S. Application Data

(60) Provisional application No. 62/109,865, filed on Jan. 30, 2015.

(58) Field of Classification Search
CPC ........ G05B 2219/32191; G08B 21/182; G08B 23/00; G08B 29/18; G06F 11/3409; G06F 11/3452; G06Q 10/0635; G06Q 10/0639
USPC ........ 340/501, 540, 999; 702/179, 182, 183; 345/440, 140
See application file for complete search history.

(56) References Cited

U.S. PATENT DOCUMENTS

| | | | |
|---|---|---|---|
| 5,552,770 A | 9/1996 | McMaster | |
| 6,031,547 A * | 2/2000 | Kennedy | G06T 11/206 345/440 |
| 6,498,976 B1 | 12/2002 | Ehlbeck | |
| 6,931,387 B1 | 8/2005 | Wong | |
| 7,113,940 B1 | 9/2006 | Jensen | |
| 7,353,057 B2 | 4/2008 | Schiessle | |
| 7,451,063 B2 * | 11/2008 | Nelson | G06F 17/50 702/183 |
| 7,522,035 B2 | 4/2009 | Albert | |
| 7,526,405 B2 | 4/2009 | Miller | |
| 7,580,632 B1 | 8/2009 | Timus | |
| 7,908,660 B2 | 3/2011 | Bahl | |
| 2005/0131318 A1 * | 6/2005 | Peifer | A61B 5/1118 600/592 |
| 2010/0102631 A1 | 4/2010 | Chiou | |
| 2012/0316981 A1 * | 12/2012 | Hoover | G06Q 30/06 705/26.4 |

OTHER PUBLICATIONS

Oktem, U.S. Appl. No. 61/533,500.
International Search Report for PCT/US12/54658.
Written Opinion for PCT/US 12/54658.
Meel A. and W.D. Seider, "Plant-Specific Dynamic Failure Assessment using Bayesian Theory." Eng. Sci., 61, 7036-7056 (2006).
Meel, A.,L.M. O'Neill, W.D. Seider, U. Oktem and N. Keren, "Operational Risk Assessment of Chemical Industries by Exploiting Accident Databases," J. Loss Preven. Proc. Indust, 20, 113-127 (2007).
Meel, A., and W.D. Seider, "Real-time Risk Analysis of Safety Systems," Comput. Chem. Eng. 32,827-840 (2008).
Oktem, U.G. and A. Meel, "Near-Miss Management: A Participative Approach to Improving System Reliability", Encyclopedia of Quantitative Risk Assessment and Analysis, Melnick, E., and Everitt, B. (eds). John Wiley & Sons Ltd., Chichester UK pp. 1154-1163 (2008).
Pariyani, A.W.D. Seider, U.S. Oktem, and M. Soroush, "Incidents Investigation and Dynamic Analysis of Large Alarm Databases in Chemical Plants: A Fluidized-Catalytic-Cracking Unit Case Study," Ind. Eng. Chem. Res., 49,8062-8079 (2010).
Pariyani, A., W.D. Seider, U.S. Oktem, and M. Soroush, "Improving process safety and product quality using large databases," 20th European Symposium on Computer Aided Process Engineering (ESCAPE), 28, 175-180 (2010).
Pariyani, A.P. Kleindorfer, U.G. Oktem, W.D. Seider, "Assessment of Catastrophe Risk and Potential Losses in Industry", AIChE J. 58(3):812-825 (2012).
Pariyani, Ankur, et al. "Dynamic risk analysis using alarm databases to improve process safety and product quality: Part II—Data compaction." AIChE Journal 58.3 (2012): 826-841.
Pariyani Ankur, Ulku Oktem and Warren D. Seider. "Near-Miss Management to Develop Dynamic Leading Indicators to Predict Incidents." 6th Global Conference on Process Safety, AIChE Spring Meeting, Austin, Texas (2010).
Oktem, U. et. al. "Near-Miss Incident Management in the Chemical Process Industry." Risk Analysis 23.3 (2003): 445-459.
Oktem, U. et. al. "Near-miss management: Managing the bottom of the risk pyramid." Risk Reg (Special Issue on close calls, near misses and early warnings) (2010): 12-13.

* cited by examiner

DYNAMIC PREDICTION OF RISK LEVELS FOR MANUFACTURING OPERATIONS THROUGH LEADING RISK INDICATORS: DYNAMIC RISK ANALYZER ENGINE

CROSS-REFERENCE TO RELATED APPLICATION

This application is a continuation-in-part of and claims the priority and benefit of U.S. patent application Ser. No. 14/511,729, entitled "Dynamic Prediction of Risk Levels for Manufacturing Operations through Leading Risk Indicators: Alarm-based Intelligence and Insights, filed Oct. 10, 2014. This application also claims the priority and benefit of U.S. Provisional Patent Application Ser. No. 62/109,865, entitled "Dynamic Prediction of Risk Levels for Manufacturing Operations through Leading Risk Indicators: Dynamic Risk Analyzer Engine," filed on Jan. 30, 2015. The entireties of each application are incorporated herein by reference in their entireties.

FIELD OF THE INVENTION

The dynamic risk analyzer (DRA) of the present invention periodically assesses real-time or historic process data, or both, associated with an operations site, such as a manufacturing, production, or processing facility, including a plant's operations, and identifies hidden near-misses of such operation, when in real time the process data appears otherwise normal. The DRA assesses the process data in a manner that enables operating personnel including management at a facility to have a comprehensive understanding of the risk status and changes in both alarm and non-alarm based process variables. The hidden process near-miss data may be analyzed alone or in combination with other process data and/or data resulting from prior near-miss situations to permit strategic action to be taken to reduce or avert the occurrence of adverse incidents or catastrophic failure of a facility operation.

BACKGROUND OF THE INVENTION

Every low-probability, high-consequence adverse incident or catastrophic operational failure at any production or processing facility, such as a chemical plant, fluid-catalytic-cracking units (FCCU) at a petroleum refinery, nuclear energy production plant, or even a biological facility or waste management facility, is preceded by many high-probability, low-consequence events, which may or may not be recognized by alarms or are considered near-misses (Pariyani et al., Ind. Eng. Chem. Res. 49:8062-8079 (2010a); Pariyani et al., 20th European Symposium on Computer Aided Process Engineering (ESCAPE) 28:175-180 (2010b)). Some of these events remain hidden in the background of normal operating conditions. An ideal risk management system at the plant will account for the near-misses, especially those that are hidden, and develop indicators to notify the operators in advance of undesirable incidents that are likely to happen. In particular, such knowledge becomes highly desirable for unmanned plants/facilities.

For example, in the following situations, the public has been harmed by industrial accidents, adverse events, and/or catastrophic failures that could have been avoided with a DRA system. For example, the US government chemical safety board web site (www.csb.gov) is inundated with reports of accidents that took place in the chemical manufacturing facilities in the recent years that cost several lives, as well as property damage. The recurring themes in the outcome of analysis of these accidents are a) the lack of preventive maintenance, and b) the lack of attention to process near-misses. Moreover, every year billions of dollars are lost in the manufacturing industry due to "trips" (unexpected shutdowns due to malfunction of the equipment and/or control systems) at operational plants and facilities. For instance, there have been $6 billion/year losses recorded by US refineries from unexpected shut downs and associated incidents of crude and fluidized catalytic cracking (FCC) units.

An additional condition, which is frequently observed in most manufacturing or processing facilities, is silencing (muting) the alarms that are considered to be nuisance. These are alarms that are activated so often that they are considered to be of such little significance by the operators, that they are regarded as unimportant disturbances resulting from normal operations, so they are turned off or ignored like fire drills in office buildings. But such actions negate the value of the alarm system. For example, at an offshore refinery facility visited in 2011 by the inventors, most of the "low priority" alarms had been silenced. In fact, one of the reasons that the BP off shore accident in Gulf of Mexico in 2010 (where 11 people died and 17 were injured) was not identified in its early stages was because an alarm had been silenced after it had been going off in the middle of the night and awaking the workers.

Most safety activities are reactive and not proactive, and as a result many organizations wait for losses to occur before taking preventative steps to prevent a recurrence. Near miss incidents often precede loss producing events, but are either hidden within process operations and related data or are largely ignored because no injury, damage, or loss actually occurred. Thus, many opportunities to prevent an accident or adverse incident are lost. However, recognizing and reporting near miss incidents, particularly measurable near misses, such as, for example, by alarms in an alarm-monitored plant/facility or by comparative data, can make a major difference to the safety of workers within organizations, and often to the public at large, e.g., in the case of a nuclear-powered facility wherein in a systems failure poses a significantly high amount of risk. History has shown repeatedly that most loss producing events (accidents) were preceded by warnings or near-miss accidents.

Thus there is a need, not met until the present invention, for a "dynamic risk analyzer" (DRA) system that periodically analyzes real time and historic data to assess operational risks and identify near-misses of alarm and non-alarm based process variables, which are hidden as normal operating conditions and to send alert signals and/or reports to identify the hidden risk and to reduce or prevent adverse incidents or failures.

BRIEF DESCRIPTION OF THE FIGURES

The description discloses the invention that is illustrated with reference to the accompanying figures to advise one of ordinary skill in the art of the characteristics and benefits of the invention. In the various views of the figures, like reference characters designate like or similar parts, whereby.

DESCRIPTION OF THE INVENTION

Figure 1:
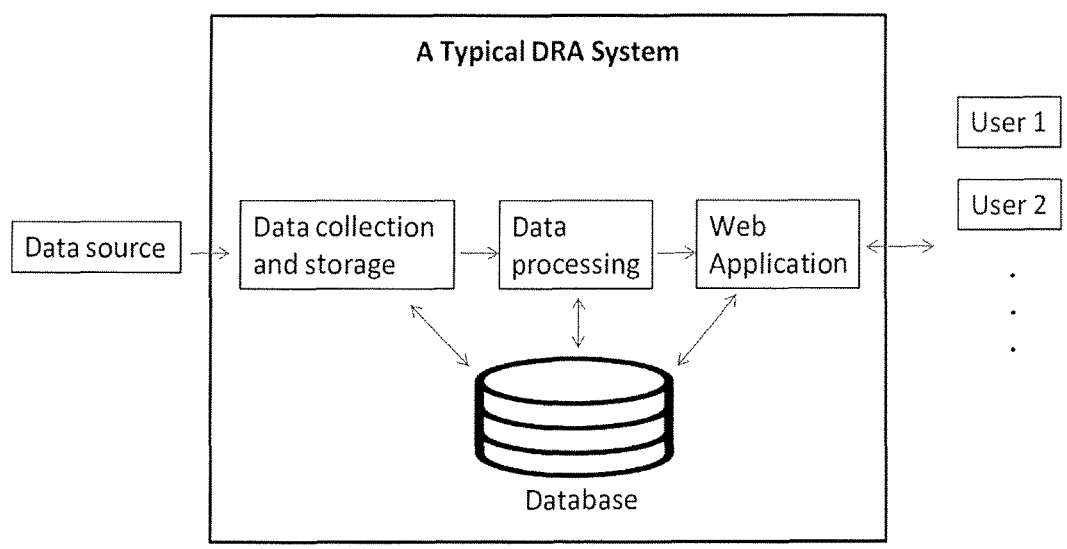
FIG. 1 shows a DRA system of the present invention.

In general, and unless otherwise indicated, singular elements may be in plural and vice versa with no loss of generality.

As used herein, each of the following terms has the meaning associated with it in this application.

The phrase "process data" is used to refer to data resulting from real-time measurements of both alarm and non-alarm based process variables associated with a plant/facility including temperature, pressure, and the like. More specifically, "process data" is the collection of all or at least some of the values of process parameters that are measured, recorded, and reported by the distributed control system (DCS) for a process or plant, wherein a hierarchy of controllers is connected by communications networks for command and monitoring of control elements distributed throughout the system, or any other device that automatically measures the value of one or more variables and reports the data either in-real time or periodically, or both. For example, process data can include, but not be limited to, values including temperature measured in a reactor, at an inlet stream or an outlet stream, pressure of a reactor, flow rate of a liquid or gas going into or out of a reactor, liquid level in a reactor or a tank, and the like. In large industrial operations, there are hundreds of process variables that can be measured and reported. An industrial manufacturing operation centered around a reactor would have several parameters that are associated with that "reactor unit" (reactor and its associated peripheral equipment). Also there are, for example, several parameters associated with a liquid flowing into a reactor including its temperature, pressure, viscosity, etc. Together the values of all these parameters comprise "process data."

The phrase "real time" is used in its plain and ordinary meaning.

The phrase "distributed control system" or alternatively "DCS" is used to refer to a system of processors used as controllers that implement proprietary interconnections, control strategies, and standard communications protocol for communication. Input and output modules form component parts of the DCS. The processor receives information from input modules and sends information to output modules. Linked into the wired and/or wireless network, the input modules receive information from input instruments in the process or field and the output modules transmit instructions to the output instruments in the field. The inputs and outputs can be, for example, either analog signal which are continuously changing or discrete signals which are 2 state either on or off. Computer buses or electrical buses connect the processor and modules through multiplexer or demultiplexers. Buses also connect the distributed controllers with the central controller and finally to the Human-machine interface (HMI) or control consoles. The elements of a DCS may connect directly to physical equipment such as switches, pumps and valves and to Human Machine Interface (HMI) via SCADA. The differences between a DCS and SCADA is often subtle, especially with advances in technology allowing the functionality of each to overlap.

The phrase "near-miss" is used herein to refer to something narrowly avoided; a lucky escape. More specifically, a "near miss" for safety purposes is an unplanned event that did not result in actual injury, illness, or damage—but had the potential to do so, especially if left unaddressed.

The term "group" is used to refer to a collection of parameters that typically share one or more common characteristic(s).

The phrase "hidden process near-miss" is used to refer to a near-miss event or a series of events (often not obvious to the plant/facility operators through naked eye) that can be identified within process data of an operation. These events can be treated as precursors to accidents, hence, can be utilized by plant/facility operators as well as management to improve the system performance and prevent potential accidents.

The phrase "risk results" is used to refer to information on hidden near-misses that indicate events or variables or their groups that exhibit risky or abnormal behavior.

The phrase "open platform communication" or alternatively "OPC" is used to refer to interoperability standards for reliable and secure exchange of data, between industrial hardware devices in the automation industry, developed by third-party vendors and solution providers. OPC standards define protocols for accessing real-time data, alarms and events, historical data and other applications. The OPC Foundation (opcfoundation.org) is responsible for the development and maintenance of the standards.

The phrase "OPC server" is used to refer to a commercially available server that is configured and functions in accordance with OPC standards and protocols and allows easy access to process data and alarms without the need to write vendor-specific programs.

The term "processor" is used to refer to a processor or processing unit, multiple processors, or multiple processing units, or other suitably configured computing element.

This description of the invention is intended to be read in connection with the accompanying figures depicting embodiments of the invention.

Figure 2:
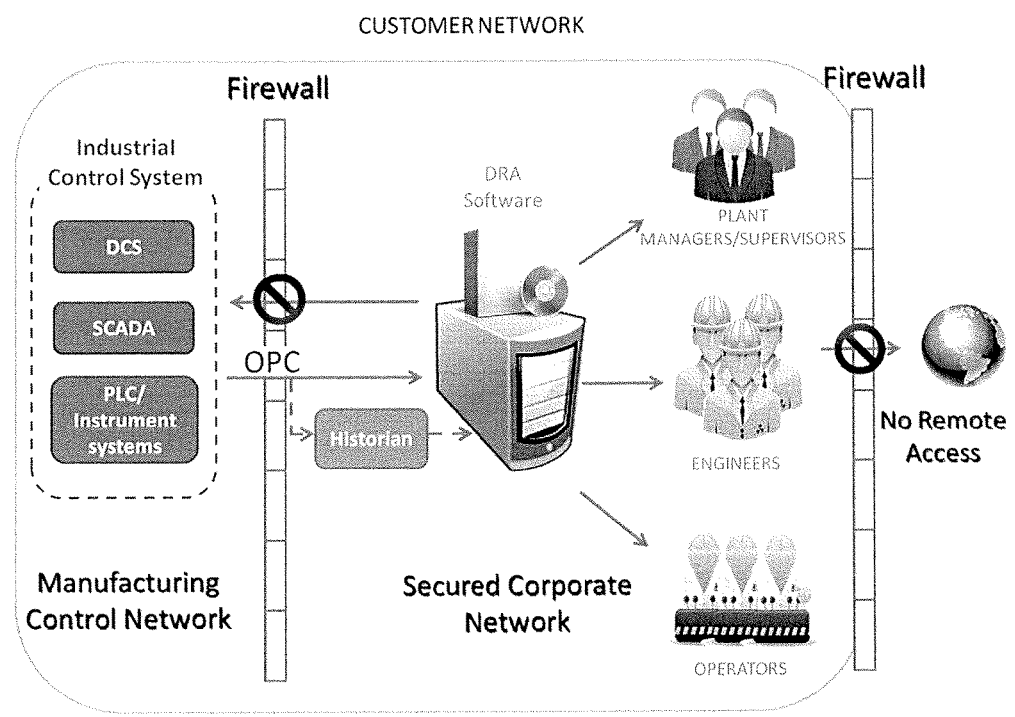
FIG. 2 shows a DRA system within a secured network with no remote access where connectivity with the OPC server allows the DRA system to obtain continuous process data, as it gets measured and channeled out, without requiring any direct communication with the industrial controls system (such as DCS, SCADA, or PLC devices).

Referring to FIGS. 1-2, the dynamic risk analyzer (DRA) comprises a system for analyzing process data periodically (at a specific calculation interval) to identify risk results in connection with risk analysis processes for an operations site. The DRA system is useful for analyzing the process risk levels of an operations site, e.g., a manufacturing, production, or processing facility, on a periodic basis (e.g., minute, hourly, daily, etc.) in real-time or historically, and identifies hidden process near-misses. The DRA system is designed specifically to address the needs of plant managers, engineers, and other operating personnel, who review risk status on a periodic basis and take strategic actions as needed.

An overview of the DRA system is shown generally in FIG. 1. The DRA system is a computer-based system that includes (1) a data collection component, to connect to data source such as OPC server or historian, etc.; (2) a computer-readable data storage medium consisting of a relational database and a key-value storage (NoSQL) solution; (3) a data processor component, consisting of risk analysis methods and a processor such as a personal computer, a laptop computer, a workstation, a tablet computer, a smart-phone, and/or portable electronic device; and (4) a data presentation platform, such as a website, e.g., Internet or Intranet. The DRA system includes an integrated wired and/or wireless communication network that links all of the components of the system.

The collection component functions by receiving process data from a data source, such as an OPC server, historian, etc., in real-time or periodically and storing the process data in the system's computer readable data storage medium. DRA receives "process data" from an OPC server or Historian at scheduled intervals (every second/minute/hour or other). The data from an OPC server can be stored in an archival server and later accessed for online/offline analyses. An archival server can be a historian system. Commercial historian systems are available in the market (see http://en.wikipedia.org/wiki/Operational_historian), which have the capability to store large volumes of data, anywhere from a few hundred data points per second to hundreds of thousands data points per second. In addition, the archival server permits end-users to browse and retrieve the historical data for several years.

The computer-readable data storage medium comprises a database, such as a relational database, and a key-value storage (NoSQL) solution. The computer readable storage medium functions by storing relevant process data and risk results and subsequently making stored data available for access by other components of the DRA system. Standard commercial or open-source packages can be used as the data storage medium. For example, MySQL, Microsoft SQL Server, and Oracle are suitable relational database solutions. Redis, MongoDB, or Oracle NoSQL can be used as key-value storage. The combination of relational and NoSQL databases allows DRA system to handle large volumes of data reliably. Alternatively, the data storage medium can include, but not be limited to, volatile memory, non-volatile memory, magnetic and optical storage devices such as disk drives, magnetic tape, CDs (compact discs), DVDs (digital versatile discs or digital video discs), removable storage, or other media capable of storing code and/or data, now known or later developed. All of the process data and risk results can reside on the computer-readable data storage medium related to a company's secured server and network that is in communication with the DRA system and are not communicated to the external world. The DRA system is designed to continue operation perpetually, without any user intervention.

The data processor functions by analyzing collected and/or stored data to identify hidden near-miss risks. The data processor may be any electronic device cable of processing, receiving, and/or transmitting instructions. For example, the processor may be a microprocessor or a microcomputer. The data processing component begins calculations starting at every T intervals (where the value of T is between 1-minute to 1-month, with the typical value being 1-day)—based on the methods, such as DRA100, DRA200, DRA300, LI100, and LI200, among others, as described in U.S. Pat. No. 8,884,759, the entirety of which is incorporated herein by reference, to obtain the risk results that are used to alter or correct a problem in an operation. Depending upon the number of variables and/or groups being analyzed, length of time interval 'T', and server speed, the data processing can take anywhere from a few seconds to several minutes or hours or days.

The data presentation platform, such as an Internet or Intranet website, functions by visually presenting risk results identified by the data processor on a computer display. The data presentation component comprises a web application that serves different web pages (dashboards) within DRA to allow the user to browse the risk results. The latest risk results are added once the data processing is complete. There are several system-based services that run continuously to support user (client) interaction with the DRA system. In an embodiment, the data presentation component can include a petal chart, which comprises a new method of presenting variation of risk values with time.

The petal chart is introduced to show variation of a parameter P over discrete time periods, which can be any measureable time period, such as a minutes, hours, days, weeks, months, years, etc. The different values of the parameter P are graphically displayed as petals next to each other relative to the discrete time period. The total number of petals in a given chart can range anywhere from 1 to 360, which a value being 7, for example. The length of a given petal indicates the value of the parameter for a given time value. If we assume that $P\epsilon[0, R]$, where R is a positive real number, then the radii of the outer and inner semicircles are equal to $R+R_0$, where $R_0$ is a real number greater than zero and can be chosen by an analyst. The maximum value of P is shown by a petal whose edge touches the outer circle of the Petal Chart. The inclusion of an outer circle depicted on a petal chart is optional. Also, in reference to FIG. 3, the angle spread of the petal chart around the center of the petal chart is 180 degrees which can be a typical value. However, petal charts can have an angle spread equal to 90° around the center of the petal chart, or alternatively an angle value of between 30° to 180° can also be plotted on a petal chart.

Figure 3:
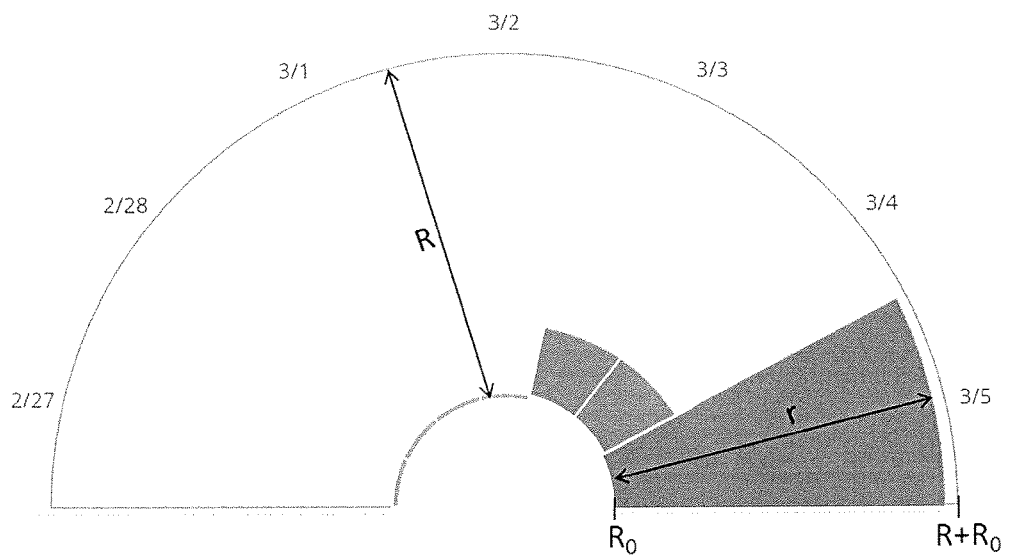
FIG. 3 shows a petal chart for parameter P indicating its 7 values over 7 time periods (days) where the value of P for March-5 is equal to r, which is indicated by the petal with length r.

For example, FIG. 3 shows a petal chart for parameter P indicating 7 values for parameter P calculated for 7 time periods, which in this case each time period equals one day. Note that the value of parameter P for March 5 (3/5) is equal to r, which is indicated by the petal with length r. Using this concept, the calculated metrics identified in U.S. Pat. No. 8,884,759 such as the dynamic risk index, the compounded risk score, the number of abnormal events, the time segment values, etc., can be plotted with a petal chart.

Figure 4A:
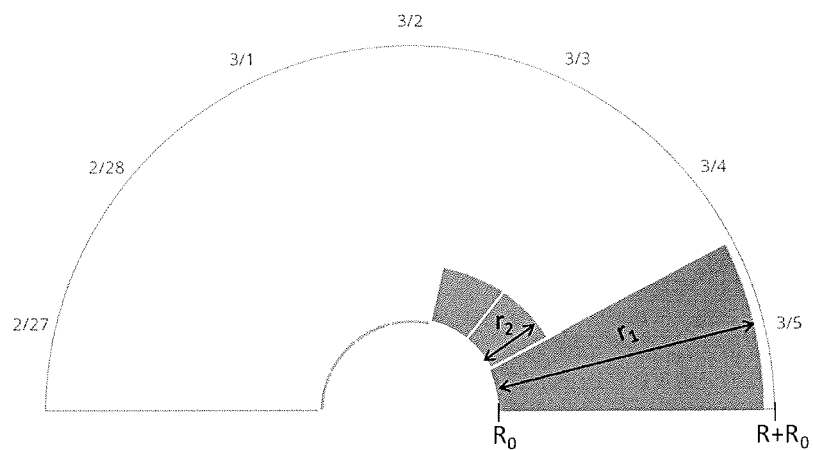
FIGS. 4A, 4B, 4C show a presentation of a variation of parameter P over 7 consecutive time intervals on the petal chart (FIG. 4A) having a comparative distinct visual advantage over a bar chart (FIG. 4B), and line chart (FIG. 4C) showing.
Figure 4B:
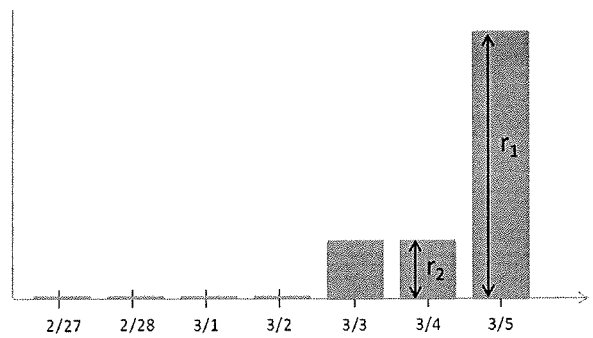
Figure 4C:
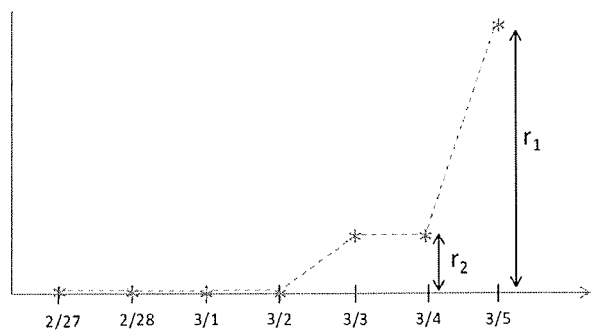

Referring now to FIGS. 4a-4c, the petal chart has a distinct visual advantage over bar charts and line charts. The variation of parameter P for 7 consecutive time intervals, wherein each time interval is a day, is plotted using a petal chart (FIG. 4a), a bar chart (FIG. 4b), and a line chart (FIG. 4c). In FIG. 4a, the area displayed by each petal, e.g., for March 5 (3/5), is equal to $\theta(r_1^2+2r_1R_0)$, wherein $\theta$ is the angle spread for the petal, with origin at the center point of the petal chart. Thus, the ratio of areas of petals for March 5 (3/5) and March 4 (3/4) is equal to $(r_1^2+2r_1R_0)/(r_2^2+2r_2R_0)$. For the special case when $R_0 \ll r_1, r_2$, this ratio is equal to $r_1^2/r_2^2$. In comparison, the bar chart shown in FIG. 4b shows the ratio of areas of bars for March 5 (3/5) and March 4 (3/4) with heights equal to $r_1$ and $r_2$, is equal to $r_1/r_2$. Similarly, the line chart shown in FIG. 4c shows the ratio of heights of data points for March 5 (3/5) and March 4 (3/4) is equal to $r_1/r_2$. This means that the relative visual impact of the value of parameter P for March 5 (3/5) with respect to that of March 4 (3/4) is more visually significant in the petal chart, when compared to the presentation of the same values for parameter P in a bar chart and a line chart. Hence, the petal chart highlights the relative difference between data points better than that depicted with traditional bar charts and line charts. The petal chart is especially beneficial for operations sites, where the end-users are busy engineers and operators who benefit from quickly viewing the relative difference between consecutive data points.

The DRA system integrated into an operations environment is shown in FIG. 2. Connectivity with the OPC server allows DRA system to obtain continuous process data, as it gets measured and channeled out, without requiring any direct communication with the industrial controls system, such as DCS, SCADA, or PLC devices. Alternatively, the DRA system can extract the process data from the Historian in real-time or at periodic intervals, e.g., every second, minute, hour, or any other time interval. Once the process data begins to arrive, the DRA system calculates "risk results" at every T interval, where the value of T can be between 1-minute to 1-month or other time parameter, with the value being 1-day in an embodiment.

The DRA can automatically identify hidden process near-misses that can potentially lead to accidents having a major impact on safety, operability, quality, and/or business.

The methods to obtain process data are defined in U.S. Pat. No. 8,884,759, the entirety of which is incorporated herein by reference, and more specifically can include methods such as DRA100, DRA200, DRA300, LI100, and LI200, among others. The DRA functions to analyze process data to identify hidden process near-misses and to report, record, and use the identified information, e.g., risk results, for system improvement purposes.

Often, in industrial operations, the number of process parameters is large. To facilitate the review and analysis of their risk results, the DRA system allows the users to aggregate the process parameters in "groups" which enables the busy operating personnel to obtain a quick high-level view of developing risks in the operations. The parameters in a group may or may not be causally related to each other. For example, in a typical plant operations, groups such as reactors, vessels, pumps, condensers, etc., can be defined.

The risk results are available via a web interface to operating team members, also known as end-users, who have access to a company's intranet portal. Operating team member can include plant managers, operational engineers, supervisors, operators, etc. The risk results can be presented using intuitive charts/dashboards in the DRA system that allow the end-users to identify hidden risks or hidden near-misses at their early stages and take strategic corrective actions to avoid adverse incidents, shutdowns, and catastrophes. Many times, the hidden risks or hidden near-misses are not patently obvious or readily available to the human eye, in spite of the operating personnel conducting daily process monitoring including shift logs review, communications with field operators, trend visualization of key process parameters, etc. The risk results calculated and communicated by the DRA system to the operating personnel present a new dimension of knowledge that not only allows the savings in time of identifying where the attention is needed, but also makes risks transparent among the entire operations staff—which is often times, not clear, nor well understood.

The methods and processes described in the disclosure of the invention can be embodied as code and/or data, which can be stored in the computer-readable storage medium as described above. When a computer system reads and executes the code and/or data stored on the computer-readable storage medium, the computer system performs the methods and processes embodied as data structures and code and stored within the computer-readable storage medium.

While the invention is described in conjunction with specific embodiments, many alternatives, modifications, permutations and variations will become apparent to those skilled in the art in light of the foregoing description. Accordingly, it is intended that the invention embraces all such alternatives, modifications, permutations and variations as falling within the scope of the claims below.

We claim:

1. A system for predicting risk levels for manufacturing operations with risk indicators comprising:

a server that receives automatically measured process data from a real-time data source and/or a historical archive data source and long-term process data for a period preceding the measured process data;

a processor that analyzes values of parameters P and/or groups G of said parameters P of said measured process data at time interval T and compares the measured process data to the long-term process data wherein the long term process data is automatically updated over time to identify operational risk and/or near-miss risk that would otherwise be unknown or concealed in parameters P, whereby said operational risk and/or near-miss risk may be used for strategic corrective action; and a display that presents said operational risk and/or near-miss risk in a graphic that visually depicts a plotted value V of parameter(s) P of said operational risk and/or near-miss risk in time interval T relationally within a specified time period;

wherein said system continuously and autonomously operates contemporaneously with said manufacturing operation.

2. The system of claim 1, wherein the process data is either an analog signal or a two-state signal.

3. The system of claim 1, wherein the process data is not communicated outside the manufacturing operation.

4. The system of claim 1, wherein the system operates perpetually without an operator.

5. A method for dynamic prediction of risk levels in a manufacturing operation comprising:

collecting measured process data, comprising: data automatically collected by a data collection component, located within said manufacturing operation, in either (a) real-time or (b) from an archive server or both;

collecting long-term process data for a period preceding the collecting measured data;

identifying risk and/or near-miss risk of said manufacturing operation that would otherwise be unknown or concealed in parameters P and/or groups G of said parameters P of process data, said process data by comparing the measured process data to the long-term process data, wherein the long term process data is automatically updated over time; and displaying said risk or near-miss risk in a graphic that visually reports a plotted value V of parameter(s) P of said risk or near-miss risk relationally within time T period, whereby said plotted value V is displayed with a variable visual indicator corresponding with magnitude of said plotted value V;

wherein said method is performed continuously and autonomously.

6. A display system for risk indicators for a manufacturing operation comprising:

identifying risk and/or near-miss risk of said manufacturing operation that would otherwise be unknown or concealed in parameters P and/or groups G of said parameters P of measured process data, in real-time, periodically, and/or historically wherein the measured process data is obtained by using a data collection component located within said manufacturing operation;

plotting parameter P of said risk and/or near-miss risk on a circular or semi-circular chart of graphic visual indicators comprising:

a petal for P parameter at each T time interval; said petal comprising an area plotted with a radius R having a maximum and minimum reportable length and an angle spread greater than 1 degree, wherein said length of said radius R corresponds with a magnitude of said parameter P at said T time interval and partially determines said area of said petal displayed on said chart; and displaying said parameter P at a time interval on said chart over a predetermined time period.

\* \* \* \* \*